United States Patent [19]

Nagatomo et al.

[11] Patent Number: 5,484,945
[45] Date of Patent: Jan. 16, 1996

[54] PREPARATION PROCESS OF POLYSUCCINIMIDE

[75] Inventors: Akinori Nagatomo; Hiroaki Tamatani; Masanobu Ajioka; Akihiro Yamaguchi, all of Kanagawa, Japan

[73] Assignee: Mitsui Toatsu Chemicals, Inc., Tokyo, Japan

[21] Appl. No.: 288,454

[22] Filed: Aug. 10, 1994

[30] Foreign Application Priority Data

Aug. 24, 1993 [JP] Japan .................................. 5-209234

[51] Int. Cl.$^6$ .............................................. C07D 207/10
[52] U.S. Cl. ........................ 548/520; 548/518; 548/519; 528/361
[58] Field of Search ...................... 548/520, 518, 548/519, 361

[56] References Cited

U.S. PATENT DOCUMENTS

| | | | |
|---|---|---|---|
| 3,052,655 | 9/1962 | Fox et al. ................................. | 260/78 |
| 4,363,797 | 12/1982 | Jacquet et al. ........................... | 424/70 |
| 5,057,597 | 10/1991 | Koskan ................................... | 528/328 |
| 5,142,062 | 8/1992 | Knebel et al. ........................... | 548/545 |
| 5,219,952 | 6/1993 | Koskan et al. .......................... | 525/419 |
| 5,219,986 | 6/1993 | Cassata .................................. | 530/324 |
| 5,221,733 | 6/1993 | Koskan et al. .......................... | 530/333 |
| 5,296,578 | 3/1994 | Koskan et al. .......................... | 528/363 |
| 5,310,865 | 5/1994 | Enomoto et al. ........................ | 528/361 |

FOREIGN PATENT DOCUMENTS

| | | | |
|---|---|---|---|
| 578449 | 1/1994 | European Pat. Off. ............... | 528/363 |
| 593187 | 4/1994 | European Pat. Off. ............... | 530/324 |
| 2403353 | 9/1977 | France .................................. | 528/328 |
| 48-20638 | 6/1973 | Japan .................................... | 424/70 |
| 92/14753 | 9/1992 | WIPO .................................... | 528/328 |

OTHER PUBLICATIONS

CA 103:19186g Reactive . . . ligands, p. 283, 1985.
J. Amer. Chem. Soc., vol. 80, p. 3361 (1958).
J. Org. Chem., vol. 24, p. 1662 (1959).
J. Org. Chem., vol. 26, p. 1084 (1961).

*Primary Examiner*—Joseph K. McKane
*Attorney, Agent, or Firm*—Burns, Doane, Swecker & Mathis

[57] ABSTRACT

In the process for preparing polysuccinimide by dehydration condensation of aspartic acid in an organic solvent, polysuccinimide can be obtained simply and suitably in industry by removing a portion or more of the organic solvent from the reaction mixture while charging to the reaction mixture an additional organic solvent containing less amount of water than that of the removed organic solvent.

12 Claims, No Drawings

PREPARATION PROCESS OF POLYSUCCINIMIDE

BACKGROUND OF THE INVENTION

1. Field of the Invention

The present invention relates to a preparation process of polysuccinimide which is useful intermediate in a medicine and so on, and more particularly relates to a preparation process of high molecular weight polysuccinimide by heating aspartic acid in organic solvent and carrying out dehydration condensation.

2. Description of the Related Art

Generally polyamino acids are often used as a model compound of protein in the field of medicine and biochemistry. Polysuccinimide is a precursor in the synthesis of polyaspartic acid which is useful as an environmentally suitable and water soluble polymer, and additionally is a useful intermediate in the synthesis of pharmacologically valuable poly-(aspartic acid)-hydroxyalkylamide as disclosed in Japanese Patent Publication SHO 48-20638.

As to preparation of polysuccinimide, J. Amer. Chem. Soc., 80, 3361(1958) discloses a process for conducting heat condensation of aspartic acid at 200° C. for 2~3 hours, however, the molecular weight of polysuccinimide obtained by the process is about 10,000. J. Org. Chem., 24, 1662(1959) discloses a process for conducting heat condensation of a derivative of maleic acid, malic acid or aspartic acid so as to prepare polysuccinimide having a molecular weight of 15,000 to 28,000. However, the process requires a step for synthesis of a derivative as a raw material. J. Org. Chem:, 26, 1084(1961) discloses a process for heating aspartic acid in tetralin for a long time, however, polysuccinimide obtained by the process has a low molecular weight and remarkable coloring.

U.S. Pat. No. 3,052,855 discloses a preparation process of a copolymer of aspartic acid copolymer or a glutamic acid in the presence of a phosphoric acid, and Japanese Patent Publication SHO 48-20638 discloses a process for carrying out the reaction in the form of a thin layer by using 85% phosphoric acid in a rotary evaporator to obtain high molecular weight polysuccinimide. Although any of these processes leads to polysuccinimide having a high molecular weight, it is disadvantageous to industrialize any of the processes, because the process leads to solidification of the reaction product and thus causes difficulty in stirring and isolating operations and additionally is very difficult to scale up. As a result, the process is unfavorable in industry.

Further, U.S. Pat. No. 4,363,797 discloses a process for conducting polymerization in a high boiling point solvent such as diphenyl ether in the presence of an ion exchange resin. However, polysuccinimide obtained by the process has a molecular weight of about 10,000.

As to a production process of polysuccinimide in industry, it has been known a process for conducting heat condensation in a fluid bed dryer (U.S. Pat. No. 5,057,597), a process for reacting maleic anhydride with ammonia and further heating with polysuccinimide (U.S. Pat. No. 5,219,952), and a process for dehydrating aspartic acid under reduced pressure (U.S. Pat. No. 5,219,986). However, polysuccinimide obtained by these processes has a molecular weight of about 10,000. A high molecular weight product cannot be obtained. U.S. Pat. No. 5,142,062 has described that high molecular weight polysuccinimide can be obtained by conducting heat condensation of aspartic acid under reduced pressure in the presence of a phosphoric acid, successively mechanical comminuting the reaction product and further conducting polymerization. However, the process causes solidification of the reaction product and leads to a problem of difficult operation.

SUMMARY OF THE INVENTION

An object of the invention is to provide a process for preparing high molecular weight polysuccinimide from aspartic acid.

As a result of an intensive investigation in order to obtain high molecular weight polysuccinimide by heat-dehydrating aspartic acid in an organic solvent, the present inventors have found that the condensation reaction can be progressed with water removal by distilling out generated water with an organic solvent from the reaction system while charging to the reaction system an additional organic solvent containing less amount of water than that of the distilled solvent, and that, as a result, polysuccinimide having a weight-average molecular weight of 10,000 or more can be prepared industrially with ease. Thus the present invention has been completed.

That is, the aspect of the invention is a preparation process of polysuccinimide by dehydration condensation of aspartic acid in an organic solvent comprising removing a portion or more of the organic solvent from the reaction mixture while charging to the reaction mixture an additional organic solvent containing less amount of water than that of the removed organic solvent.

The preparation process of the invention can provide polysuccinimide having a satisfactory polymerization degree in an organic solvent with simple procedures.

DETAILED DESCRIPTION OF PREFERRED EMBODIMENTS

The mechanism for forming polysuccinimide is generally thought that aspartic acid is converted to anhydride, anhydride reacts with an amino group to form amic acid, and amic acid is further dehydrated to form polysuccinimide.

The organic solvents which can be used in the invention have a suitably high boiling point. Exemplary solvents include mesitylene, naphthalene, tetralin, diethylbenzene, pentylbenzene, dodecylbenzene and other aromatic hydrocarbons; dichlorobenzene, trichlorobenzene and other aromatic halogenated hydrocarbons; phenethol, butyl phenyl ether, diphenyl ether, dimethoxybenzene and other aromatic ethers; and nitrobenzene and other aromatic nitro compounds. In these organic solvents, particularly preferred compounds are diphenyl ether based compounds, that is, diphenyl ether and substituted diphenyl ether, and include, for example, 4,4'-dimethyl-diphenyl ether, 3,3'-dimethyldiphenyl ether, 3-methyldiphenyl ether and other alkyl substituted diphenyl ethers; 4,4'-dibromodiphenyl ether, 4,4'-dichlorodiphenyl ether and other halogen substituted diphenyl ethers; 4-methoxydiphenyl ether, 4-methyl-4'-methoxydiphenyl ether and other alkoxy substituted diphenyl ethers; and dibenzofuran, xanthene and other cyclic diphenyl ethers.

When these organic solvents are used singly, the reaction mixture becomes heterogeneous and the reaction proceeds in a suspended or blocked state. The above organic solvents can be used as a mixture with other solvents such as dimethylformamide (DMF), dimethylacetamide (DMAc), N-methylpyrrolidone (NMP), N,N'-dimethylimidazolidinone (DMI), dimethylsulfoxide (DMSO), sulfolane and other aprotic polar organic solvents. The reaction mixture can be homogeneous depending on a mixing ratio of the polar solvents.

The total amount of the organic solvents are preferably chosen so as to obtain a polymer concentration of 10~80% by weight.

Water generated in the reaction process of the invention is distilled off from the reaction mixture together with the organic solvent used. Water and the organic solvent preferably form an azeotropic mixture. However, formation of the azeotropic mixture is not necessarily required. The organic solvent may or may not separate from water. Alternatively, preparation can also be conducted by such procedures that water is removed under reduced pressure in the early stage of the reaction without solvent, thereafter the organic solvent is added to the reaction system, and water is distilled out of the reaction mixture while removing a portion of the organic solvent from the reaction mixture.

The organic solvent which was distilled with water is treated with a drying agent or distilled to reduce its water content and returned to the reaction mixture, or can be dried by using other solvents and returned to the reaction mixture. A new organic solvent containing less amount of water can be charged in place of the distilled organic solvent.

Exemplary drying agents which can be used in the invention include molecular sieves such as molecular sieves 3A, molecular sieves 4A, molecular sieves 5A and molecular sieves 13X; diphosphorus pentoxide, alumina, silica gel, calcium chloride, calcium sulfate, concentrated sulfuric acid, magnesium perchlorate, barium oxide, calcium oxide, potassium hydroxide and sodium hydroxide; metal hydrides such as calcium hydride, sodium hydride, and lithium aluminum hydride; or alkali metals such as sodium. In these drying agents, molecular sieves, diphosphorus pentoxide and metal hydrides are preferred. Molecular sieves are particularly preferred in view of handling and recycle with ease.

An additional organic solvent means an organic solvent which contains less amount of water than that of the distilled solvent and is added to the reaction mixture in the course of the reaction. The additional organic solvent is charged by mounting a column which is packed with a drying agent such as molecular sieve on the reaction vessel so as to return the distilled solvent to the reaction vessel by way of the column, by treating the distilled solvent in another reaction vessel having a drying agent and thereafter returning the solvent to the reaction vessel, or by charging to the reaction vessel a new solvent containing less amount of water.

High water content of the additional organic solvent inhibits increase in polymerization degree of the formed polymer, and thus the water content of the solvent must be minimized in order to obtain high molecular weight polysuccinimide. Water content higher than 500 ppm inhibits an increase in polymerization degree of the polymer in the case of certain solvents. As a result, the polysuccinimide obtained has a molecular weight of 10,000 or less. The moisture content of the solvent is preferably 100 ppm or less, more preferably 50 ppm or less and most preferably 10 ppm or less.

Any of L-, D- and DL-isomer of aspartic acid can be used for the invention. No particular limitation is imposed upon the reaction a temperature. The reaction cannot progress at low a temperature and thus is carried out usually at 160° C. or above. However, too high a temperature is liable to cause heat decomposition. The preferred temperature is in the range of 180°~220°.

The reaction can progress in the absence of a catalyst. However, a catalyst can be used and catalyst use can be expected to lower the reaction temperature and shorten the reaction time.

Reaction catalysts are protonic acids such as phosphoric acid, sulfuric acid, p-toluenesulfonic acid and trifluoromethanesulfonic acid; metals of the group II, III, IV and V in the periodic table; and salts of these metals. Exemplary catalysts include, for example, zinc powder, tin powder, aluminum, magnesium and other metals; zinc oxide, tin oxide, magnesium oxide, titanium oxide and other metal oxides; tin chloride, magnesium chloride, aluminum chloride and other metal halogenides; zinc carbonate, magnesium carbonate and other metal carbonates; stannous octoate, stannous acetate, zinc acetate and other metal organic carboxylates; zinc sulfate, aluminum sulfate and other metal sulfates; tin trifluoromethane sulfonic acid, zinc trifluoromethane sulfonic acid; tin methanesulfonate, zinc p-toluenesulfonate and other metal sulfonates; dibutyltin oxide and other organic metal oxides of the above metals; titanium isopropoxide and other metal alkoxides of the above metals; and DOWEX, AMBERLITE and other ion exchange resins.

The amount of the catalyst used is usually 0.001~50% by weight for the weight of aspartic acid.

The reaction is preferably carried out in an inert gas atmosphere. The inert gas can be bubbled or ventilated. The reaction can also be carried out under reduced pressure depending upon the boiling point of the solvent. Further, the reaction can also be conducted batch wise, semibatch wise or continuously.

EXAMPLES

The present invention will hereinafter be illustrated in detail by way of examples and comparative examples. However, these examples are not to be construed to limit the scope of the invention.

The amount of water in the solvent was measured with a Karl-Fisther's moisture meter, MKC-210 (Trade Mark of Kyoto Denshi Kogyo Co.)

The inherent viscosity ($\eta$) of polysuccinimide was measured at 25° C. with an Ubbelohde viscometer on a solution containing 0.1 g of polymer in 100 ml of DMF and calculated from the following equation:

$$\eta = \frac{\ln(t/t_0)}{C} \quad (dl/g)$$

wherein t: Flow down time of the solution (sec)

$t_0$: Flow down time of the solvent (sec)

C: Concentration of the solution (g/dl).

The weight-average molecular weight (Mw) of polysuccinimide was measured by GPC using polystyrene as a reference.

Example 1

To a reaction vessel equipped with a Dean-Stark trap, 30 g of L-aspartic acid and 150 g of diphenyl ether were charged and the resulting suspension was stirred at 205° C. under reduced pressure for 2 hours to carry out azeotropic dehydration. Successively the Dean-Stark trap was taken off from the reaction vessel and a column packed with 20 g of molecular sieve 3A was mounted on the vessel so as to return the distilled solvent to the vessel after passing through the column. The reaction was further continued at 210° C. for 10 hours under reduced pressure.

The water content of the solvent was 5 ppm after passing through the molecular sieves. After finishing the reaction, the suspension was filtered, washed with acetone and dried at 110° C. for 6 hours under reduced pressure of 5 mmHg. Polysuccinimide thus obtained was 20.1 g (yield 92.2%). The polymer obtained had an inherent viscosity (η) of 0.14 dl/g and a weight average molecular weight (Mw) of 25,000.

Example 2

To a reaction vessel equipped with a Dean Stark trap, 30 g of aspartic acid, 150 g of diphenyl ether and 0.6 g of magnesium oxide catalyst were charged. The resulting suspension was stirred at 190° C. for 6 hours under reduced pressure of 135 mmHg to carry out azeotropic dehydration. Thereafter the Dean-Stark trap was removed from the reaction vessel and a column packed with molecular sieves 3A was mounted on the vessel so as to return the distilled solvent to the vessel after passing through the column. The reaction was further continued at 190° C. for 15 hours under reduced pressure of 135 mmHg. The water content of the solvent was 5 ppm after passing through the molecular sieves.

After finishing the reaction, the suspension was filtered, washed with acetone and dried at 110° C. for 6 hours under reduced pressure of 5 mmHg. Polysuccinimide thus obtained was 19.7 g (yield 90.0 %). The polymer had η of 0.15 dl/g and Mw of 30,000.

Example 3

To a reaction vessel equipped with a Dean Stark trap, 30 g of L-aspartic acid, 150 g of nitrobenzene and 1.5 g of p-toluenesulfonic acid were charged. The resulting suspension was stirred at 210° C. for 2 hours under atmospheric pressure to carry out azeotropic dehydration.

Thereafter the Dean Stark trap was removed from the reaction vessel and a column packed with molecular sieves 3A was mounted on the vessel so as to return the distilled solvent to the vessel after passing through the column. The reaction was further continued at 210° C. for 10 hours under atmospheric pressure. The water content of the solvent was 5 ppm after passing through the molecular sieves. After finishing the reaction, the suspension was filtered, washed with acetone, and dried at 110° C. for 6 hours under reduced pressure of 5 mmHg. Polysuccinimide thus obtained was 18.7 g (yield 85.5%). The polymer had η of 0.20 dl/g and Mw of 45,000.

Example 4

To a reaction vessel equipped with a Dean-Stark trap, 30 g of aspartic acid, 150 g of diphenyl ether and 15 g of 85% phosphoric acid were charged. The mixture was stirred at 145° C. for 0.5 hour under atmospheric pressure to carry out azeotropic dehydration. The reaction became heterogeneous, bulk material was stirred and the reaction was progressed. Thereafter the Dean-Stark trap was removed from the reaction vessel, and Dean-Stark trap was removed from the reaction vessel, and a column packed with 20 g of molecular sieves 3A was mounted on the vessel so as to return the distilled solvent to the vessel after passing through the column. Further, 100 g of NMP was added to the reaction mixture, and the reaction was continued at 180° C. for 16 hours under atmospheric pressure while bubbling nitrogen gas. The water content of the solvent was 3 ppm after passing through the molecular sieves.

After finishing the reaction, acetone was added to the reaction mixture. Precipitate formed was filtered, washed with acetone, successively washed with water and dried at 60° C. for 4 hours under reduced pressure of 5 mmHg and at 110° C. for 4 hours reduced pressure of 5 mmHg. Polysuccinimide thus obtained was 19.9 g (yield 90.9%). The polymer had η of 0.24 dl/g and Mw of 60,000.

Comparative Example 1

The reaction was carried out at 210° C. for 20 hours under atmospheric pressure by using 30 g of aspartic acid and 150 g of diphenyl ether. The suspension was filtered washed with acetone and dried at 110° C. for 6 hours under reduced pressure of 5 mmHg. Polysuccinimide thus obtained was 19.7 g (yield 90.0%). The polymer had η of 0.074 g dl/g and Mw of 10,000.

Comparative Example 2

The reaction was carried out at 230° C. for 3 hours by using 30 g of aspartic acid, 30 g of ion exchange resin AMBERLITE IR-120H (Trade Mark of Rohm and Haas Co.), and 150 g of diphenyl ether. After finishing the reaction, the suspension was filtered together with the ion exchange resin washed with acetone and dissolved by adding 120 g of DMF. After filtering off the ion exchange resin, the filtrate was reprecipitated by addition of water. The precipitate was filtered, washed with acetone and dried at 110° C. for 6 hours under reduced pressure of 5 mmHg.

Polysuccinimide thus obtained was 18.1 g (yield 82.7%). The polymer had η of 0.082 dl/g and Mw of 10,000.

However, these examples are not intended to limit the scope of the present invention. This may be practiced or embodied in still other ways without departing from the spirit or essential character thereof.

We claim:

1. A preparation process of polysuccinimide by dehydrating condensation of aspartic acid in an organic solvent reaction mixture comprising conducting a condensation reaction of the aspartic acid while distilling water generated by the reaction and organic solvent from the reaction mixture and charging additional organic solvent containing a lower amount of water than contained in the distilled solvent and wherein said reaction forms a heterogeneous mixture during the condensation of the aspartic acid.

2. A preparation process of polysuccinimide of claim 1 wherein the organic solvent removed from the reaction mixture is dehydrated by bringing into contact with a drying agent and returned as an additional organic solvent to the reaction mixture.

3. A preparation process of polysuccinimide of claim 2 wherein the drying agent is molecular sieves diphosphorus pentoxide or a metal hydride.

4. A preparation process of polysuccinimide of claim 1 wherein the additional organic solvent being charged to the reaction mixture has a water content of 500 ppm or less.

5. A preparation process of polysuccinimide of claim 1 wherein the additional organic solvent being charged to the reaction mixture has a water content of 100 ppm or less.

6. A preparation process of polysuccinimide of claim 1 wherein the additional organic solvent being charged to the reaction mixture has a water content of 50 ppm or less.

7. A preparation process of polysuccinimide of claim 1 wherein the organic solvent is one or more compounds selected from aromatic hydrocarbon, aromatic halogenated hydrocarbon, aromatic ether and an aromatic nitro compound.

8. A preparation process of polysuccinimide of claim 1 wherein the polysuccinimide has a molecular weight of 10,000 or more.

9. A preparation process of polysuccinimide of claim 1 wherein the dehydration condensation is progressed in the presence of a catalyst.

10. A preparation process of polysuccinimide of claim 9 wherein the catalyst is phosphoric acid, sulfuric acid, p-toluenesulfonic acid, trifluoromethanesulfonic acid, zinc powder, tin powder, aluminum, magnesium, zinc oxide, tin oxide, magnesium oxide, titanium oxide, tin chloride, magnesium chloride, aluminum chloride, zinc carbonate, magnesium carbonate, stannous octoate, stannous acetate, zinc acetate, zinc sulfate, aluminum sulfate, tin trifluoromethanesulfonate, zinc trifluoromethanesulfonate, tin methanesulfonate or zinc p-toluenesulfonate.

11. A preparation process of polysuccinimide of claim 1 wherein the polysuccinimide forms as a suspension in the organic solvent.

12. A preparation process of polysuccinimide of claim 1 wherein the organic solvent is a diphenyl ether compound.

* * * * *

UNITED STATES PATENT AND TRADEMARK OFFICE
CERTIFICATE OF CORRECTION

PATENT NO. : 5,484,945

DATED: : January 16, 1996

INVENTOR(S) : Nagatomo et al

It is certified that error appears in the above-identified patent and that said Letters Patent is hereby corrected as shown below:

Column 6,

In claim 3, line 57, after "sieves" insert -- , --.

Signed and Sealed this

Nineteenth Day of November, 1996

Attest:

BRUCE LEHMAN

*Attesting Officer*     *Commissioner of Patents and Trademarks*